United States Patent Office 2,822,996
Patented Feb. 11, 1958

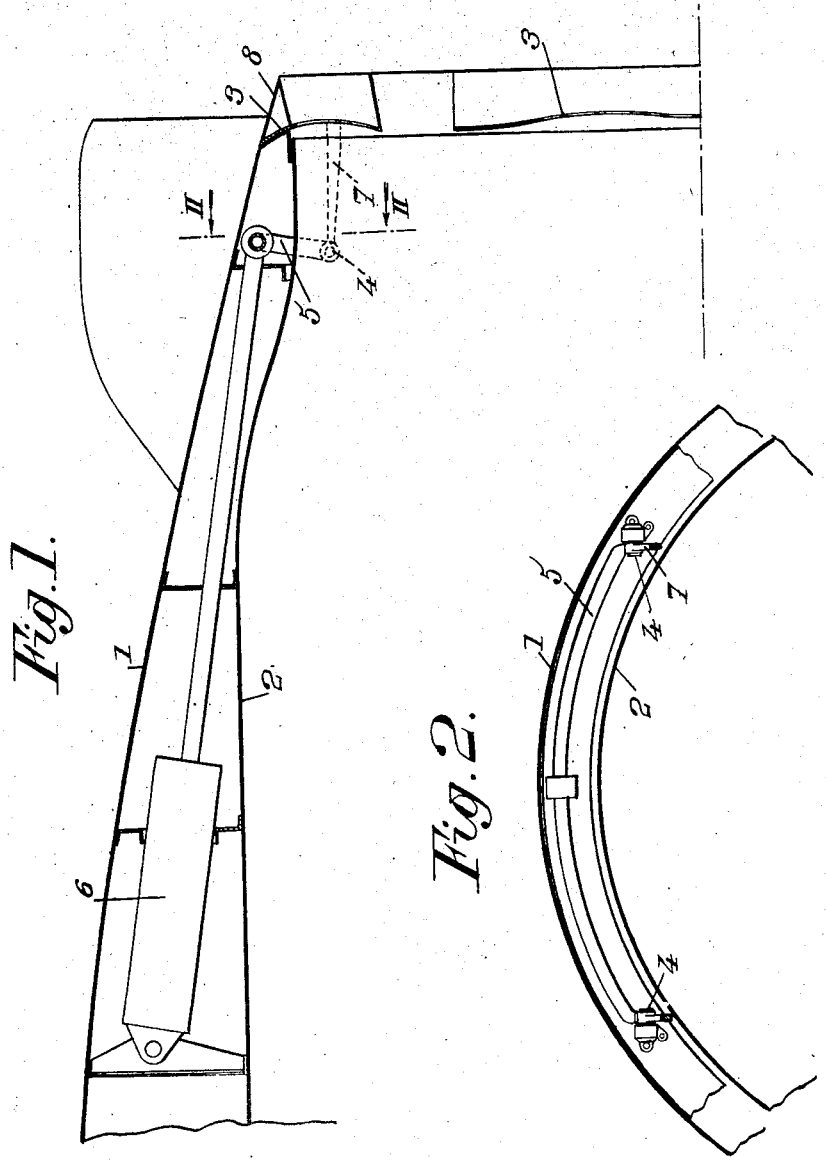

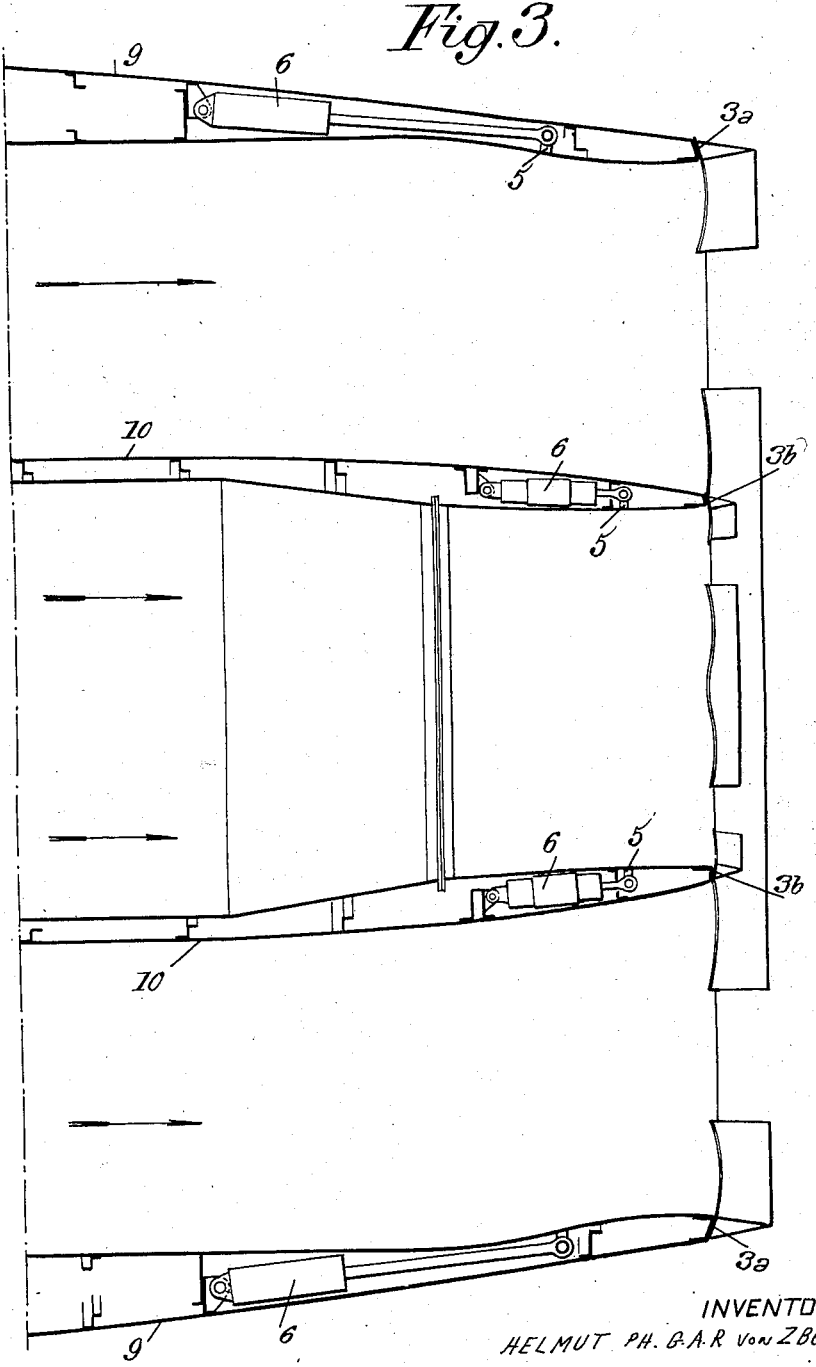

2,822,996

AIRCRAFT PROVIDED WITH SPOILERS

Helmut P. G. A. R. von Zborowski, Brunoy, France

Application August 1, 1955, Serial No. 525,726

Claims priority, application France August 6, 1954

4 Claims. (Cl. 244—52)

The present invention relates to aircraft provided with spoilers, this word designating any elements adapted to occupy a position where it projects from a surface guiding a gaseous stream, the shifting of such an element from its retracted position to said projecting position (this shifting corresponding to a displacement substantially at right angles to said surface) having for its effect to modify the air flow along said surface. The present invention is more especially, but not exclusively, concerned with aircraft including components (such as a main aerodynamic supporting surface, a tail unit, a fairing, a jet nozzle, and so on) in the form of a tunnel and in particular of annular shape.

The present invention is applicable to the case where the aerodynamic component on which the spoiler is to be mounted is of substantial thickness and has two walls on which two distinct gaseous streams flow respectively. According to the essential feature of my invention, the spoiler is adjustably held with respect to said components in such manner that it can be made to project at will either from one of said walls or from the other.

Other features of my invention will become apparent in the course of the following description of some specific embodiments thereof, with reference to the accompanying drawings, given merely by way of example and in which:

Fig. 1 is an axial half sectional view of a ram-jet casing provided with spoilers and made according to the present invention.

Fig. 2 is a transverse sectional view on the line II—II of Fig. 1.

Fig. 3 is an axial sectional view of the rear end of an aircraft having a tunnel-shaped annular wing and propelled by a ram-jet engine, this aircraft being provided with spoilers according to the present invention.

My invention applies in a general fashion to any aircraft including an aerodynamic component, which will be hereinafter supposed to be of annular tunnel shape, of substantial thickness and having two walls 1 and 2 along which two distinct gaseous streams flow respectively.

The construction illustrated by Fig. 1 relates, by way of example, to the case where the aerodynamic annular component is a ram-jet engine casing. In such a construction, the gaseous stream flowing along the external wall 1 is the air in the surrounding atmosphere whereas the gaseous stream flowing along the internal wall 2 is a jet of combustion gases.

Between said walls 1 and 2 and in the trailing edge of said casing, I provide spoilers 3 capable, when caused to project with respect to said walls, of modifying the gaseous flow along said wall.

As above stated, according to the essential feature of my invention, said spoilers are adjustably controlled by means arranged so that every spoiler 3 can be made to project either from wall 1, that is to say into the external gaseous stream, or from wall 2, that is to say into the internal gaseous stream.

Spoilers 3 are distributed at regular intervals along the periphery of the trailing edge of the ram-jet casing (i. e. the angular distance between two successive spoilers is the same).

Advantageously, there is an even number of spoilers diametrally opposed by pairs. For instance, it is advantageous to provide four spoilers forming two pairs at 90° to each other.

With such an arrangement it will be possible, by providing a suitable control of the spoilers, to obtain:

Either a guiding effect by causing the spoilers to occupy disymmetrical positions with respect to the axis of the ram-jet casing (whether they act on the external flow and on the internal flow), Or a modification of the cross-section of the passage afforded to the gaseous streams in the plane where are located the spoilers, by imparting to said spoilers symmetrical displacements with respect to the axis of the nozzle.

In particular, the means for controlling the displacements of the spoilers may be arranged so that two diametrally opposed spoilers are moved in a continuous fashion, either both in the same direction or in opposed directions respectively.

When spoilers 3 are intended to act upon the flow of gases passing through the ram-jet engine, there are still two possibilities, to wit, on the one hand that of obtaining a guiding effect by displacing two opposed spoilers in the same direction, in which case the section of flow afforded to the gaseous stream remains unchanged, which is generally advantageous, and on the other hand that of modifying said section of flow (so as to take into account particular circumstances) by operating the two opposed spoilers in opposed directions.

Of course, the same effects might be obtained with an odd number of spoilers but it would then be more difficult to coordinate their displacements.

I will now describe some constructional features of my invention.

According to one of these features, each spoiler 3 is shaped so that its sections by planes parallel to the middle plane of the spoiler parallel to the gaseous stream are circular arcs. For instance, the spoiler may be a cylindrical sector, said spoiler being displaced by pivoting thereof about a fixed axis 4 which preferably is the locus of the centers of said circular arcs.

With such an arrangement, the forces necessary to displace the respective spoilers 3 are considerably reduced.

According to another feature of my invention, each spoiler is carried by an arcuate member or shaft 5 having the same curvature as a portion of the nozzle and located between walls 1 and 2, as shown by Fig. 2.

Said arcuate member 5 is acted upon in its middle portion by the movable element of a jack 6, the ends of said arcuate member 5 being pivoted at 4 to the structure of the ram-jet casing where said ends are rigid with small rods 7 carrying the corresponding spoiler 3.

With such a construction, it is possible to house the spoiler control means wholly between walls 1 and 2, while reducing the distance between said two walls, which is obviously advantageous.

According to still another feature of my invention, each spoiler 3 is reinforced by a tail portion 8 extending rearwardly and having a profile such that, when the spoiler is in neutral position, said tail portion forms a rearward extension, in the sector occupied by the spoiler, of the profile of the aerodynamic component 1—2, on which said spoiler is mouned. In other words, portion 8 of the spoiler then constitutes the trailing edge of the aerodynamic component 1—2.

It should be noted that what has been called the "neutral position" of the spoiler may be such that the spoiler occupying this position already interferes with one of the internal or external flows.

In the above described example it has been supposed that the spoilers are mounted on the trailing edge of a ram-jet engine casing, but of course I may apply such a construction to other aerodynamic components of annular shape.

In particular, such spoilers might be mounted on an annular wing 9 surrounding a jet engine (for instance a ram-jet engine) the casing of which is shown at 10, two sets of spoilers 3a and 3b being provided respectively on the trailing edge of the annular wing 9 and on the trailing edge of casing 10.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. In an aircraft including a tunnel-shaped aerodynamic component of substantial thickness having two walls, to wit an internal one and an external one, along which two distinct gaseous streams flow respectively, the combination of a plurality of spoilers distributed along a transverse section of said component, means located inside said component for holding each of said spoilers adjustably with respect to said component, an arcuate member in the form substantially of a circular arc housed in said component concentrically therewith, the ends of said member being pivoted to said component about a common axis transverse to the axis of said tunnel-shaped component, said member being rigid with said spoiler holding means, and control means operatively connected with the central portion of said member for pivoting said member about said common axis.

2. In an aircraft including a tunnel-shaped aerodynamic component of substantial thickness having two walls, to wit an internal one and an external one, along which two distinct gaseous streams flow respectively, the combination of a plurality of spoilers distributed along a transverse section of said component, means located inside said component for holding each of said spoilers adjustably with respect to said component so as to cause it to project at will either from one of said walls or from the other, an arcuate member in the form substantially of a circular arc housed in said component concentrically therewith, the ends of said member being pivoted to said component about a common axis transverse to the axis of said tunnel-shaped component, said member being rigid with said spoiler holding means, and control means operatively connected with the central portion of said member for pivoting said member about said common axis.

3. In combination, an aerodynamic component of substantial thickness having two walls along which two distinct gaseous streams flow respectively, the rear end of said component having, along at least one portion of the span thereof, a rear end wall transverse to said two first mentioned walls, a spoiler member including a front wall slidable along said rear end wall of said component transversely to said first mentioned walls and a streamlined trailing edge portion fixed to said front wall, said trailing edge portion being shaped to constitute a streamlined extension of said component rearwardly of said transverse rear end wall when said spoiler member is in neutral position, and means for moving said spoiler member with respect to said component to slide said spoiler member front end wall along said component rear end wall in a direction transverse to said two first mentioned walls, so as to cause at will said spoiler member front end wall to project outwardly from either of said two first mentioned walls.

4. A combination according to claim 3 in which said rear end wall of said component and said front end wall of said spoiler member are located in a cylindrical surface the axis of which is located frontwardly of said spoiler and said means for moving said spoiler member are adapted to pivot it about said axis.

References Cited in the file of this patent

UNITED STATES PATENTS 2,595,504  Avery _____ May 6, 1952